US012482061B2

United States Patent
Tanjim et al.

(10) Patent No.: US 12,482,061 B2
(45) Date of Patent: Nov. 25, 2025

(54) DEBIASING IMAGE TO IMAGE TRANSLATION MODELS

(71) Applicant: ADOBE INC., San Jose, CA (US)

(72) Inventors: Md Mehrab Tanjim, San Diego, CA (US); Krishna Kumar Singh, San Jose, CA (US); Kushal Kafle, Sunnyvale, CA (US); Ritwik Sinha, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 612 days.

(21) Appl. No.: 17/880,120

(22) Filed: Aug. 3, 2022

(65) Prior Publication Data

US 2024/0046412 A1  Feb. 8, 2024

(51) Int. Cl.
G06T 3/4053 (2024.01)
G06T 3/4046 (2024.01)

(52) U.S. Cl.
CPC .......... *G06T 3/4046* (2013.01); *G06T 3/4053* (2013.01)

(58) Field of Classification Search
CPC .......................... G06T 3/4046; G06T 3/4053
See application file for complete search history.

(56) References Cited

U.S. PATENT DOCUMENTS

2021/0374756 A1* 12/2021 Pandey .................... G06N 3/08

OTHER PUBLICATIONS

Kang, Minguk, and Jaesik Park. "Contragan: Contrastive learning for conditional image generation." Advances in Neural Information Processing Systems 33 (2020): 21357-21369. (Year: 2020).*
Deviyani, Athiya. "Assessing dataset bias in computer vision." arXiv preprint arXiv:2205.01811 (2022). (Year: 2022).*

* cited by examiner

*Primary Examiner* — Amandeep Saini
*Assistant Examiner* — Denise G Alfonso
(74) *Attorney, Agent, or Firm* — Shook Hardy & Bacon L.L.P.

(57) ABSTRACT

A system debiases image translation models to produce generated images that contain minority attributes. A balanced batch for a minority attribute is created by oversampling images having the minority attribute from an image dataset. An image translation model is trained using images from the balanced batch by applying supervised contrastive loss to output of an encoder of the image translation model and an auxiliary classifier loss based on predicted attributes in images generated by a decoder of the image translation model. Once trained, the image translation model is used to generate images with the minority image when given an input image having the minority attribute.

19 Claims, 12 Drawing Sheets

DEBIASING IMAGE TO IMAGE TRANSLATION MODELS

BACKGROUND

Image translation models, such as those generated using generative adversarial networks (GANs), perform image-to-image translation tasks. Given an input image in a first domain, an image translation model generates an image in a second domain. For instance, super-resolution is an image-to-image translation task in which an image translation model generates a high resolution image from a low-resolution input image. Other examples of image-to-image translation tasks include sketch-to-image generation, image inpainting, semantic label-to-image, unpaired translation, and multi-modal image synthesis.

SUMMARY

Embodiments of the present invention relate to, among other things, a system that debiases image translation models such that the image translation models can generate images with minority attributes that appear infrequently in training data. Given an image dataset for training an image translation model, a balanced batch of images is generated by over-sampling images with at least one minority attribute in the image dataset. The balanced batch is used to train the image translation. During training, a supervised contrastive loss is applied to latent representations generated by an encoder of the image translation model given images from the balanced batch. The supervised contrastive loss causes latent representations with a minority attribute to be pushed together in the latent space while pushing apart latent representations with a converse majority attribute. An auxiliary classifier loss is also applied during training based on attributes predicted by a classifier for images generated by a decoder of the image translation model. The auxiliary classifier loss further assists in separating latent representations in the latent space of the image translation model. After training, the image translation model can be used to generate an image with at least one minority attribute given an input image having the at least one minority attribute.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Definitions

Figure 1:
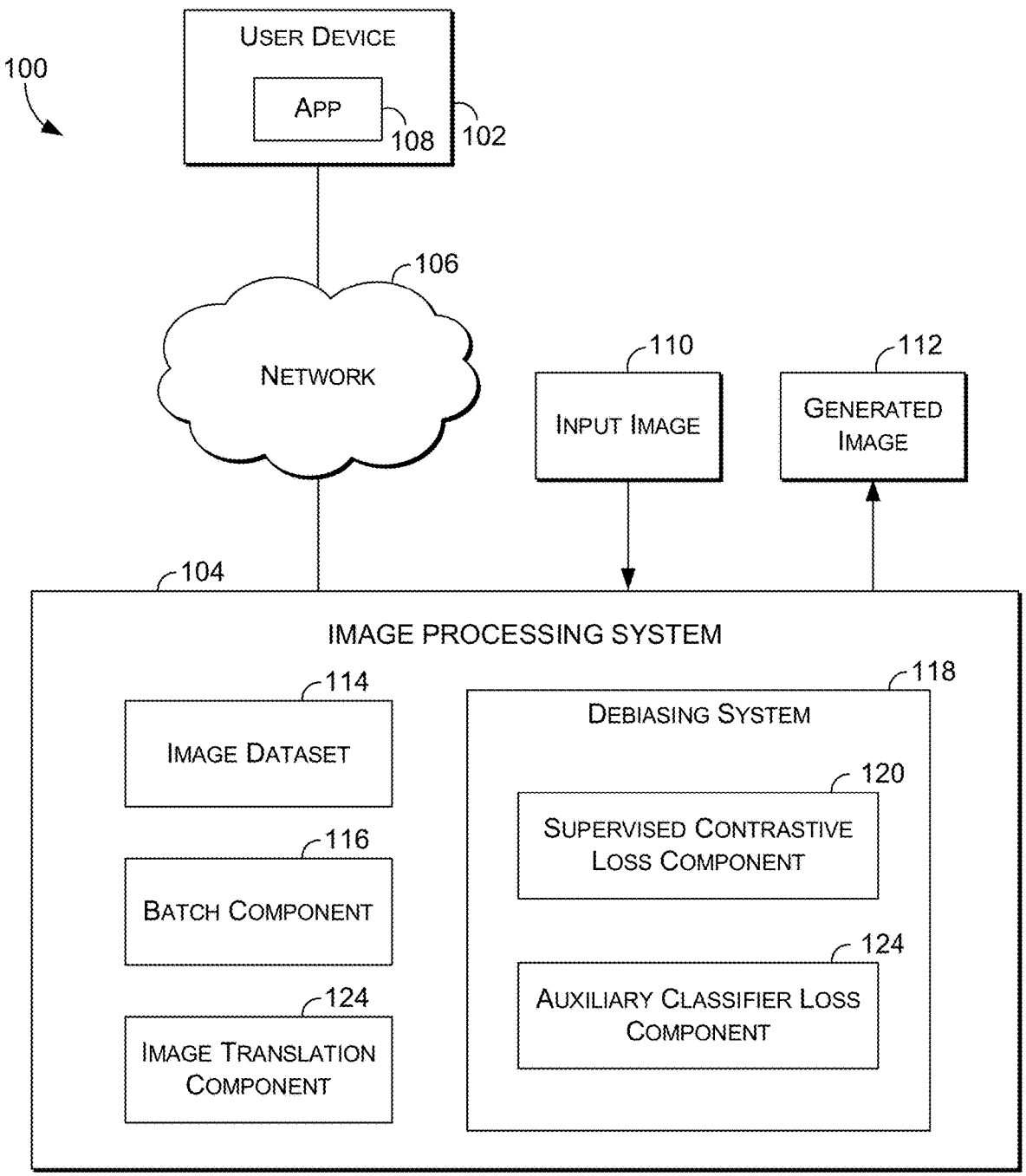
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, an "image translation model" comprises a machine learning model trained to perform image-to-image translation tasks. Given an input image in a first domain, an image translation model generates a new image in a second domain. In some instances, an image translation model can be trained using a "generative adversarial network (GAN)", which comprises networks incorporating deep learning methods and generative modeling.

As used herein, an "image dataset" is a training dataset of images used in image-to-image translation tasks. In accordance with some aspects of the technology described herein, an image dataset is used to train an image translation model to accomplish image-to-image translation tasks. An example of an image data includes CelebA-HQ, which contains a significant number of high resolution images.

As used herein, a "minority attribute" is an attribute appearing statistically infrequently in an image dataset. As examples to illustrate, wearing eyeglasses and baldness could be identified as minority attributes in an image dataset based on the attributes appearing in five percent and two percent, respectively of images of the image dataset.

As used herein, a "majority attribute" is an attribute appearing statistically frequently in an image dataset.

As used herein, a "balanced batch" is a training dataset of images in which a minority attribute in an image dataset is represented more evenly. For instance, a balance batch is generated in some configurations by oversampling images with a minority attribute such that images with the minority attribute comprise about half of the total number of images in the balanced batch.

As used herein, a "pre-trained classifier" is a saved network that was previously trained on a large-scale image-classification task. Examples include ResNet152 and ResNet 50.

As used herein, an "auxiliary classifier loss" applies binary cross entropy loss to improve the convergence of a deep network toward the selected minority attribute.

As used herein, "supervised contrastive loss" is an alternative loss function that effectively leverages image label information.

As used herein, "Frechet Inception Distance (FID)" is a metric used to assess the quality of images created by a generative model.

Overview

Image translation models can be used to synthesize high-fidelity images in many image-to-image translation tasks, including super-resolution, sketch-to-image, and image inpainting, to name a few. While current state of the art image translations models, such as the Pix2Pix model, can achieve good quality results in many cases, the image translation models perform less well with attributes comprising a minority class in the training data. In particular, image translation models are trained on large training datasets of images. In many cases, certain attributes (i.e., minority attributes) occur less frequently in images of the training dataset. As a result, image translation models are biased towards majority attributes and have difficulty in producing the minority attributes in generated images. As examples to illustrate, suppose eyeglasses and baldness are minority attributes in a training dataset of facial images because the attributes appear in less than five percent of the images in the training dataset. This results in bias in an image translation model such that the image translation model is more likely to produce images with majority attributes (i.e., no eyeglasses or hair). For instance, given an input image of a person with eyeglasses, a biased image translation model will produce a generated image in which the person is not wearing eyeglasses. As another example, given an input image of a bald person, a biased image translation model will produce a generated image in which the person has hair.

Aspects of the technology described herein improve the functioning of the computer itself in light of these shortcomings in existing image-to-image translation technologies by providing a solution that debiases image translation models. Generally, in accordance with some configurations, an image translation model is trained using resampling, contrastive learning, and minority category supervision to debias the image translation model such that it can effectively produce images with minority attributes.

Given that images with a minority attribute are rare in a training dataset, the representation of the images in the latent space of an image translation model can become similar to the majority group. As a result, the image translation model becomes biased toward frequent patterns. Aspects of the present technology remedy this problem by using techniques that result in separating the latent codes for the majority and the minority groups in the latent space of the image translation model, thereby allowing the image translation model to generate images independently from the respective distributions. To accomplish this, in some aspects, the technology described herein over-samples the minority classes to generate a balanced batch of images that are used to train the image translation model. Over-sampling forces the network to see more images with minority attributes and also assists in encoding the minority attributes.

Using the balanced batch of images, aspects of the technology described herein train the image translation model by applying supervised contrastive loss to output of an encoder of the image translation model. Supervised contrastive loss pulls together the representation of images from the same class, either minority or majority in the latent space, and pushes them apart if the images are from different classes. This results in disentangling minority features from majority features in the latent space of the image translation model.

Some aspects of the technology described herein further debias an image translation model by applying an auxiliary classifier loss that is based on the prediction of the attribute on generated images from a decoder of the image translation model. This further assists in separating the latent codes.

Aspects of the technology described herein provide a number of improvements over existing technologies. For instance, over-sampling images with minority attributes allows an image translation model to be trained with a balanced batch of images in which a minority attribute is more frequently represented. Additionally, applying a supervised contrastive loss and an auxiliary classifier loss trains the image translation model to separate latent codes for minority and majority attributes. This disentangles the features in the latent space of the image translation model. As a result, the image translation model is debiased and can more effectively produce generated images with minority attributes. Additionally, computing resource consumption is improved relative to existing technologies. Bias can result in increased computing resource consumption when more processing and detailed correction are needed to produce a satisfactory generated image. Eliminating such bias can reduce the need to correct images and also decrease computer network communications as multiple queries are not needed to supplement the image sets used to correct for the bias. Computer storage consumption can also be reduced as multiple iterations of images and accompanying correction are not needed, resulting is less use of storage. With additional image inputs no longer needed to generate the desired images network throughput and latency can also be improved as fewer image files are sent over a network.

Example System for Debiasing Image-to-Image Translation Models

With reference now to the drawings, FIG. 1 is a block diagram illustrating an exemplary system 100 for debiasing image-to-image translation models in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. The system 100 includes a user device 102 and an image processing system 104. Each of the user device 102 and the image processing system 104 shown in FIG. 1 can comprise one or more computer devices, such as the computing device 1600 of FIG. 16, discussed below. As shown in FIG. 1, the user device 102 and the image processing system 104 can communicate via a network 106, which can include, without limitation, one or more local area networks (LANs) and/or wide area networks (WANs). Such networking environment are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the image processing system 104 could be provided by multiple server devices collectively providing the functionality of the image processing system 104 as described herein. Additionally, other components not shown can also be included within the network environment.

The user device 102 can be a client device on the client-side of operating environment 100, while the image processing system 104 can be on the server-side of operating environment 100. The image processing system 104 can comprise server-side software designed to work in conjunction with client-side software on the user device 102 so as to implement any combination of the features and functionalities discussed in the present disclosure. For example, the user device 102 can include an application 108 for interacting with the image processing system 104. The application 108 can be, for instance, a web browser or dedicated application for providing functions, such as those described here. For instance, the application 108 can facilitate presentation of user interfaces that allow the user to interact with the image processing system 104, such as submitting input images, such as the input image 110, for image-to-image translation tasks, as well as presenting generated images, such as the generated image 112, to a user.

This division of operating environment 100 is provided to illustrate one example of a suitable environment, and there is no requirement for each implementation that any combination of the user device 102 and the image processing 104 remain as separate entities. While the operating environment 100 illustrates a configuration in a networked environment with a separate user device and image processing system, it should be understood that other configurations can be employed in which components are combined. For example, in some configuration, a user device can also provide image processing capabilities.

The user device 102 can comprise any type of computing device capable of use by a user. For example, in one aspect, the user device can be the type of computing device 1600 described in relation to FIG. 16 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the image processing system 104 via the user device 102.

At a high level, the image processing system 104 trains an image translation model in a manner such that the image translation model is not biased towards majority attributes. After training, the image processing system 104 receives an image with a minority attribute, such as the input image 110, and produces a generated image, such as the generated image 112, that accurately reflects the minority attribute contained in the input image. Among other components not shown, the image processing system 104 includes a batch component 116, a debiasing component 118, and an image translation component 124.

The components of the image processing system 104 can be in addition to other components that provide further additional functions beyond the features described herein. The image processing system 104 can be implemented using one or more server devices, one or more platforms with corresponding application programming interfaces, cloud infrastructure, and the like. While the image processing system 104 is shown separate from the user device 102 in the configuration of FIG. 1, it should be understood that in other configurations, some or all of the functions of the image processing system 104 can be provided on the user device 102.

In one aspect, the functions performed by components of the image processing system 104 are associated with one or more applications, services, or routines. In particular, such applications, services, or routines can operate on one or more user devices, servers, can be distributed across one or more user devices and servers, or be implemented in the cloud. Moreover, in some aspects, these components of the image processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The image processing system 104 trains an image translation model using images from an image dataset 114. In some configurations, the image dataset 114 incorporates a large number of images as a source for training an image translation model. The image dataset 114 can include pre-classified images with generated labels for attributes contained in images in the image dataset 114. The attributes include majority attributes that appear in a majority of images in the image dataset 114, such as "hair" and "not wearing glasses" in the case of images of faces. The attributes also include minority attributes that are found in a much lower percentage of images in the image dataset 114 and can include attributes such as "bald" and "wearing eyeglasses" in the case of facial images.

The batch component 116 creates a balanced batch of images that are then used to train an image translation model such that the image translation model can produce generated images with minority attributes appearing in input images. The batch component 116 selects images from the image dataset 114 to generate the balanced batch by over-sampling images with a minority attribute. As such, the balanced batch includes a subset of images from the image dataset 114 in which a minority attribute is represented at a higher percentage relative to the image dataset 114. For instance, the batch component 116 could create a balanced batch in which about half of the images contain the minority attribute and about half of the images do not contain the minority attribute. The batch component 116 generates the balanced batch for input to the debiasing component 118.

The debiasing component 118 uses a balanced batch of images to train an image translation model such that the image translation model is not biased to majority attributes. As will be discussed in further detail below (e.g., with reference to FIG. 4), the image translation model can comprise an encoder-decoder architecture. In the encoder-decoder architecture, an image from a source domain is encoded to intermediate features (i.e., latent code) that are then decoded by a generator to synthesize an image in another domain. To facilitate the debiasing training process, the debiasing component 118 applies two different types of losses when training the image translation model on the balanced batch: supervised contrastive loss and auxiliary classifier loss. The supervised contrastive loss is applied by a supervised contrastive loss component 120 and the auxiliary classifier loss is applied by the auxiliary classifier loss component 122.

The supervised contrastive loss component 120 is used to further separate the codes for different attributes from one another in the balanced batch. The supervised contrastive loss component 120 pulls together representations of images from the same class, whether majority or minority, and pushes them apart mathematically if the attributes are from different classes. For example, "bald" is forced further apart from "hair" mathematically.

The differentiation produced by the supervised contrastive loss component 120 may not be sufficient to generate a generated image that contains the minority attribute. The auxiliary classifier loss component 122 is used to predict the desired attribute on the generated image and apply binary cross entropy loss, which further separates the latent codes, allowing the desired attribute to be generated more easily.

The image translation component 124 performs image-to-image translation tasks using image translation models trained by the debiasing component 118. By way of example to illustrate, the debiasing component 118 can train an image translation model for super-resolution tasks in which the image translation model generates clear images (i.e., high resolution images) from blurry input images (i.e., low resolution images). Additionally, the image translation model could be trained by the debiasing component 118 to correctly handle images with minority attributes, such as baldness and glasses in facial images. Given an input image, such as the input image 110, in a source domain (e.g., low resolution), the image translation component 124 provides the input image to the image translation model, which produces a generated image, such as the generated image 112, in a target domain (e.g., high resolution). If the input image includes a minority attribute (e.g., baldness or glasses in facial images), the image translation model has been debiased such that the minority attribute appears in the generated image.

Figure 2:
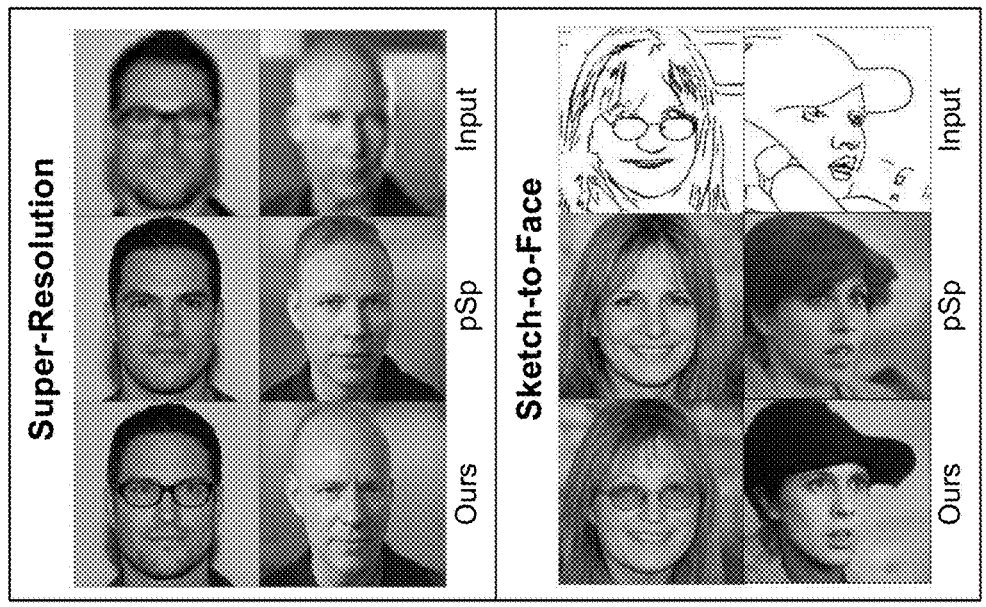
FIG. 2 illustrates bias in image-to-image translation in accordance with some implementations of the present disclosure.

FIG. 2 illustrates bias in image-to-image translation provided by a current state of the art solution (i.e., the Pixel2Style2Pixel model; "pSp") in comparison with images having minority attributes generated in accordance with some implementations of the present disclosure. FIG. 2 illustrates two image-to-image tasks: super-resolution and sketch-to-face. The top row shows input images having minority features, including eyeglasses in the first column, baldness in the second column, eyeglass in the third column, and hat in the fourth column. The middle row shows examples of image generated from the pSp network trained on the CelebA-HQ face dataset that were synthesized for the tasks of super-resolution and sketch-to-image. As can be seen from the second row of FIG. 2, the pSp model fails to generate certain attributes that are minority classes in the training data. For instance, the pSP model generated images without eyeglasses in the first and third columns, added hair in the second column, and generated an image with hair instead of a hat in the fourth column. In contrast, the bottom row shows images generated using image translation models generated using the technology described herein. As shown in the bottom row, each of the images includes the minority attribute from the corresponding input image.

The bias in the models is assumed to be known, that is, the class labels in the training data are accessible. For example, "bald" images can comprise two percent of the images in the training data, making "bald" a minority class and "non-bald" a majority class. Many datasets provide image-level class labels. If the dataset is unlabeled, the pre-trained classifiers can be used to label the classes.

Two strategies to reduce bias can be used once the dataset has labeled classes. The first strategy is to over-sample the minority class to form a more balanced training dataset for the image-to-image translation task. The second strategy is to enforce that the generated images of the minority class have a high probability of being in that class by back-propagating from a pre-trained classifier. As one example, if "bald" is a minority class for the super-resolution task, then during training the image translation model should generate high-resolution images that correspond to the low-resolution "bald" images, so that the synthetic images have a high probability of being "bald" images according to the pre-trained baldness classifier.

The first strategy, over-sampling, operates at the input level, while the pre-trained classifier operates at final generation. However, the first strategy may not sufficiently restrain the latent features of biased classes from becoming similar to the codes of non-biased classes at the encoding level. When this occurs, this bias prevents the decoder from learning the proper mapping between the latent codes and the output images from the minority and majority classes during the generation process. The second strategy, supervised contrastive learning is applied during training to separate the encoded features of the minority from the encoded features of the majority. This assists the decoder in capturing the features needed to generate images with the correct attributes for both minority and majority classes.

Bias can be measured in image-to-image translation tasks. As an example, bias in the database CelebA-HQ was analyzed. CelebA-HQ was selected because it has 40 labeled binary attributes similar to "bald" and "eyeglasses, which makes detecting bias easier compared to unlabeled data. In addition, CelebA-HQ is often used to train conditional as well as generative models.

Two main criteria were used to detect bias in the CelebA-HQ dataset. The first task was to sort the attributes by the fraction of images that contained the attributes. After determining the fractions of each attribute the minority attributes can be selected. Rare attributes have fewer instances of occurrence and can cause generation to skew against generating those attributes. A second task is to determine the reliability of attribute detection. Evaluation of the ability to detect attributes involves selecting attributes for which the classifiers show high accuracy.

To complete the two tasks, a ResNet152 classifier can be trained on the same training set as pSp and then filter any attribute having a low F1 score. The low F1 score can use a threshold of 0.8, however, other thresholds can be selected if desired. For example, "eyeglasses" has an F1 score of 0.95, while "blurry" has an F1 score of 0.0. Using the F1 scores clearly indicates that "eyeglasses" has better feature image representation than "blurry". Table 1 shows the results analyzing the bias in the CelebA-HQ dataset. The analysis indicates that attributes can be selected that have high F1 scores and are also rare in the dataset, providing easily labeled rare attributes.

Figure 3:
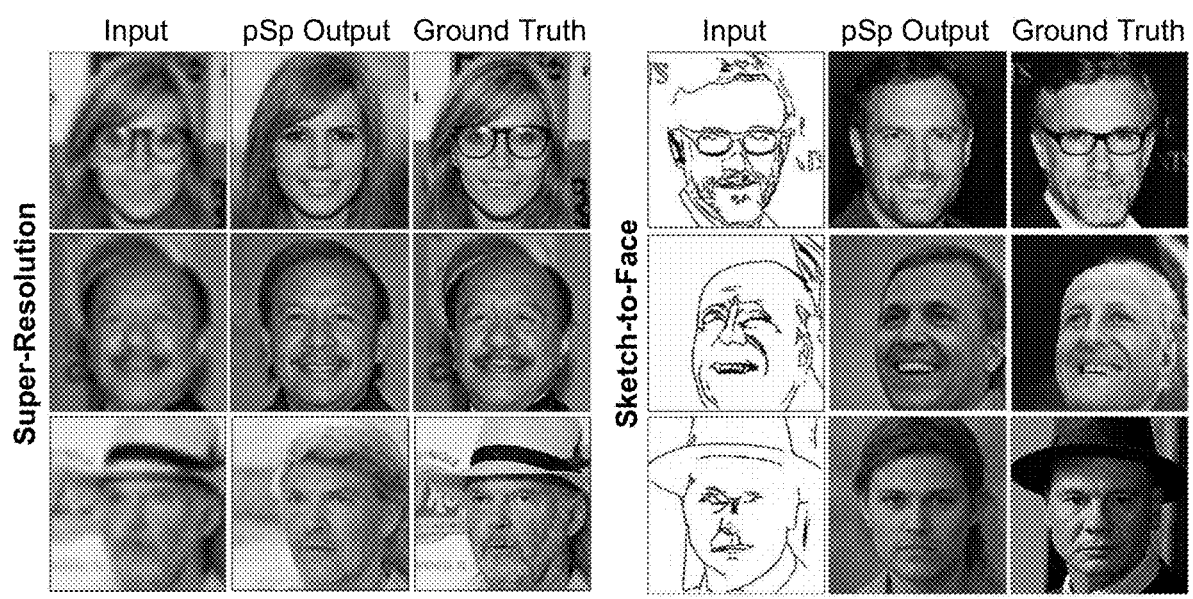
FIG. 3 illustrates bias in image-to-image translation for super-resolution and sketch-to-face in accordance with some implementations of the present disclosure.

FIG. 3 illustrates bias in image-to-image translation for super-resolution and sketch-to-face in accordance with some implementations of the present disclosure. The images in FIG. 3 show that none of the generated images from the previously trained pSp network for the tasks were faithfully reproduced, even though the attributes in question are clearly visible in the input images. The classifier can also be run to verify that the minority attributes are visible in the input images, either low-resolution images or hand sketches and had high F1 scores. As an example, low resolution images of "wearing hat" have an F1 score of 0.8513. The F1 value above the threshold value indicates that the input images have information about the minority attribute that the pSp network should be able to reconstruct.

When bias is present the CelebA-HQ model can also add features, in addition to failing to include some minority attributes. This has occurred with the attribute "bald" where the generated images hallucinate hair. Both FIGS. 2 and 3 show examples of hair incorrectly added to the generated image. These types of errors adversely affect applications that use the generated images as inputs for further processing.

Embodiments discussed below provide a general debiasing framework. Measuring bias can be both task and dataset dependent. Bias can be measured by measuring the differ-

TABLE 1

Bias analysis in the CelebA-HQ dataset.

| Attribute | Bald | Wearing Hat | Eyeglasses | Blond Hair | Bangs | Black Hair | Male | Heavy Makeup | High Cheekbones | Smiling |
|---|---|---|---|---|---|---|---|---|---|---|
| Percentage ↓ | 2.37 | 3.56 | 4.89 | 17.09 | 18.08 | 21.97 | 36.86 | 45.69 | 46.16 | 46.97 |
| F1 Score on Real | 0.8142 | 0.8908 | 0.9825 | 0.8483 | 0.8756 | 0.8186 | 0.9791 | 0.8906 | 0.8576 | 0.9333 |
| F1 score on generated ↓ | 0.7216 | 0.2500 | 0.0984 | 0.8288 | 0.8393 | 0.7725 | 0.9653 | 0.8444 | 0.8235 | 0.9082 |

The least three values in Percentage and F1 Score on Synthetic are shown in bold.

It can be shown that being a minority attribute in the training dataset poses a bias problem for image-to-image translation tasks. To show this problem, the classifier F1 scores can be calculated on generated images and then the performance on the minority attributes can be assessed. The ground truth test images were down-sampled by a factor of eight and then the super-resolution pSp network that had earlier been trained on the same dataset was applied.

Having a low F1 score means either low recall or low precision. In the case of low recall the model failed to generate the desired attribute in the generated images. The low recall failure can be indicated by not generating images with eyeglasses when the ground truth image contained eyeglasses. A low precision failure can be indicated when the model generates an attribute that was not present in the ground truth image. An example of a low precision failure can be producing hair when the ground truth image indicates bald. As a result, a low F1 score on the generated images can reveal biases for the attribute.

Table 1 above shows the F1 scores on generated images and also the percentage of biases class and classifier F1 scores on the ground truth. The failures or under-performance is most pronounced on the attributes that are rare. There is a significant drop in the F1 scores between the generated images and the ground truth images when the attribute comprises less than five percent of the images in the dataset. FIG. 3 also illustrates examples of the appearance of bias.

ences or discrepancies of the attributes between the ground truth or real images and the generated images. Once the bias is known, the general debiasing framework can be applied to debias any image-to-image translation model.

Figure 4:
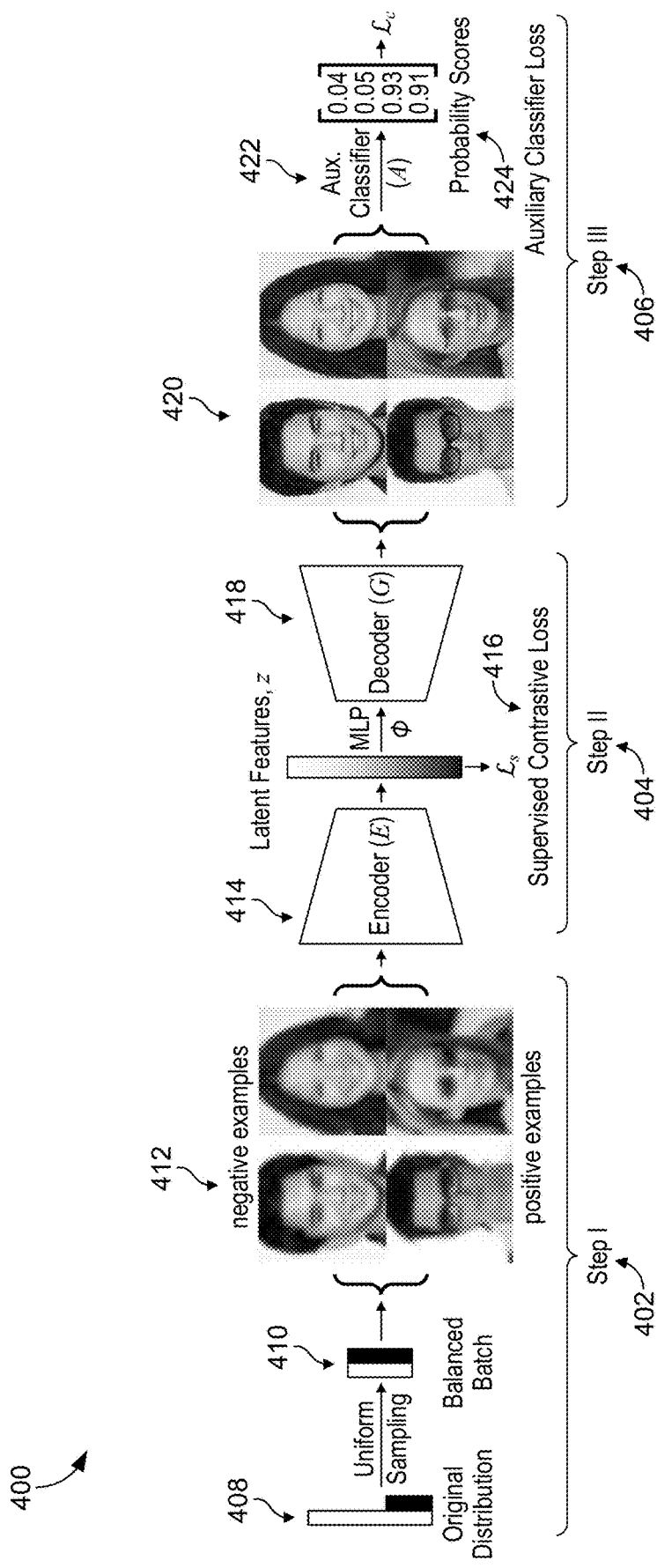
FIG. 4 is a process flow diagram of a debiasing framework in accordance with some implementations of the present disclosure.

FIG. 4 is a process flow diagram of a debiasing framework 400 in accordance with some implementations of the present disclosure. The debiasing framework 400 trains an image translation model to generate images with minority attributes when input images have the minority attributes. As shown in FIG. 4, the image translation model includes an encoder 414 that takes an image as input and encodes the image in a latent space providing a latent representation (i.e., latent code) of the image. The image translation model also includes a decoder 418 (also referred to herein as a generator) that decodes a latent representation of an image to generate an image.

When the images from a group, such as images that are bald, wear glasses or a hat are rare, their representation in the latent space can become similar to the majority group. This results in bias toward frequent patterns. The original distribution of images 408 has rare attributes as a minority of the total number of images. Through sampling, a balanced batch 410 is created by adding more images with the minority attributes, indicated in Step I 402 of FIG. 4. Step I 402 in FIG. 4 depicts over-sampling images with the minority attributes. The original distribution 408 is shown on the left, with images having the majority and minority attributes indicated. The balanced batch 410 includes both positive examples and negative examples of the minority attributes. The positive examples comprise images with a minority attribute, while the negative examples comprises images without a minority attribute. The balanced batch 410 is input to encoder 414 to continue the debiasing process.

In order to remedy the biasing problem, aspects of the technology described herein separate the latent codes for images with majority attributes from the latent codes for images with the minority attributes. One way to resolve this is to apply supervised contrastive loss, which is Step II 404 in FIG. 4. Supervised contrastive loss 404 gathers together the representation of images from the same class, either minority attributes or majority attributes, in the latent space and pushes them apart if the images are from different classes of attributes. Equation (1) below shows how this separation is accomplished mathematically.

$$\mathcal{L}_s = -\sum_{i \in I} \frac{1}{|P(i)|} \sum_{p \in P(i)} \log \frac{\exp(z_i \cdot z_p)/\tau}{\sum_{x \in X(i)} \exp(z_i \cdot z_x)/\tau} \quad (1)$$

Here, $i \in I \equiv 1, \ldots, N$ (N is the batch size) is the index of an arbitrary sampled image $I_i$ from the set of all images I, $X(i) \equiv I/\{i\}$, $P(i) \equiv \{p \in X(i): y_p = y_i\}$ ($y$ is the binary label or class of that image), $z_i = E(I_i)$ is the latent feature representation of the $i^{th}$ image, $I_i$ after it goes through the encoder E, and $\tau$ is the scalar temperature parameter. The positive pairs $z_p$ in the supervised contrastive loss 404 are obtained from the images that belong to the same class while negative pairs belong to different classes. For example, negative pairs can comprise a majority attribute and a minority attribute.

$L_2$ normalization can be applied to get the corresponding directions for applying supervised contrastive loss 404. It should be noted that the unit vectors or directions may not be suitable for image generation. To ensure that the unit vectors or directions can be used in image generation the latent codes, $z_i$, can be passed through a multi-layer perceptron (MLP) layer, $\phi$, after applying the $\mathcal{L}_s$ loss. The decoder 418 or generator then takes $\phi(z_i)$ as inputs used in generating the images.

Even with the application of Steps I and II as described above, the decoder 418, G, can still benefit from additional incentive to generate the attribute in question. To accomplish this, in Step III 406 of FIG. 4, an auxiliary classifier 422, $\mathcal{A}$, is applied to the intermediate features images 420 to predict and generate probability scores 424 to assist in producing the desired attribute on the generated images $G(\phi(z_i))$, from the decoder 418 and apply binary cross entropy loss as shown in equation (2) below:

$$\mathcal{L}_c = -\frac{1}{|I|} \sum_{i \in I} y_i \cdot \log(\hat{y}_i) + (1 - y_i) \cdot \left(1 - \hat{y}_i\right) \quad (2)$$

where $\hat{y}_i = \mathcal{A}(G(\Phi(z_i)))$.

This can further assist the supervised contrastive loss 404, $\mathcal{L}_s$ to separate the latent codes such that the desired attribute can be more readily generated. The final loss function is given by equation (3) below:

$$\mathcal{L} = \mathcal{L}_o + \lambda_s * \mathcal{L}_s + \lambda_c * \mathcal{L}_c \quad (3)$$

where $\mathcal{L}_o$ is the original loss function used to train the image-to-image translation model without our changes, $\mathcal{L}_s$ is the supervised contrastive loss 404, and $\mathcal{L}_c$ is the auxiliary binary cross entropy loss. The hyperparameters $\lambda_s$ and $\lambda_c$ are used to balance the different losses.

Accordingly, the method of debiasing image translation models shown in FIG. 4 has three steps: (I) re-sample from the minority images of the desired attribute and create a balanced batch 410 for the encoder 414, (2) apply supervised contrastive loss 404, $\mathcal{L}_s$, on $z_i$, the output of the encoder 414; and (3) apply the auxiliary classifier loss 406, $\mathcal{L}_c$ based on the attribute prediction from the pre-trained classifier, $\mathcal{A}$, on $G(\phi(z_i))$, the generated images from the decoder 418. After computing both the supervised contrastive loss and the auxiliary classifier loss, the final loss can be computed using equation (3) and the results used to back-propagate and train the image translation model. An advantage to the method is that it does not depend on any particular encoder-decoder architecture and can be used with any image translation model.

Figure 5:
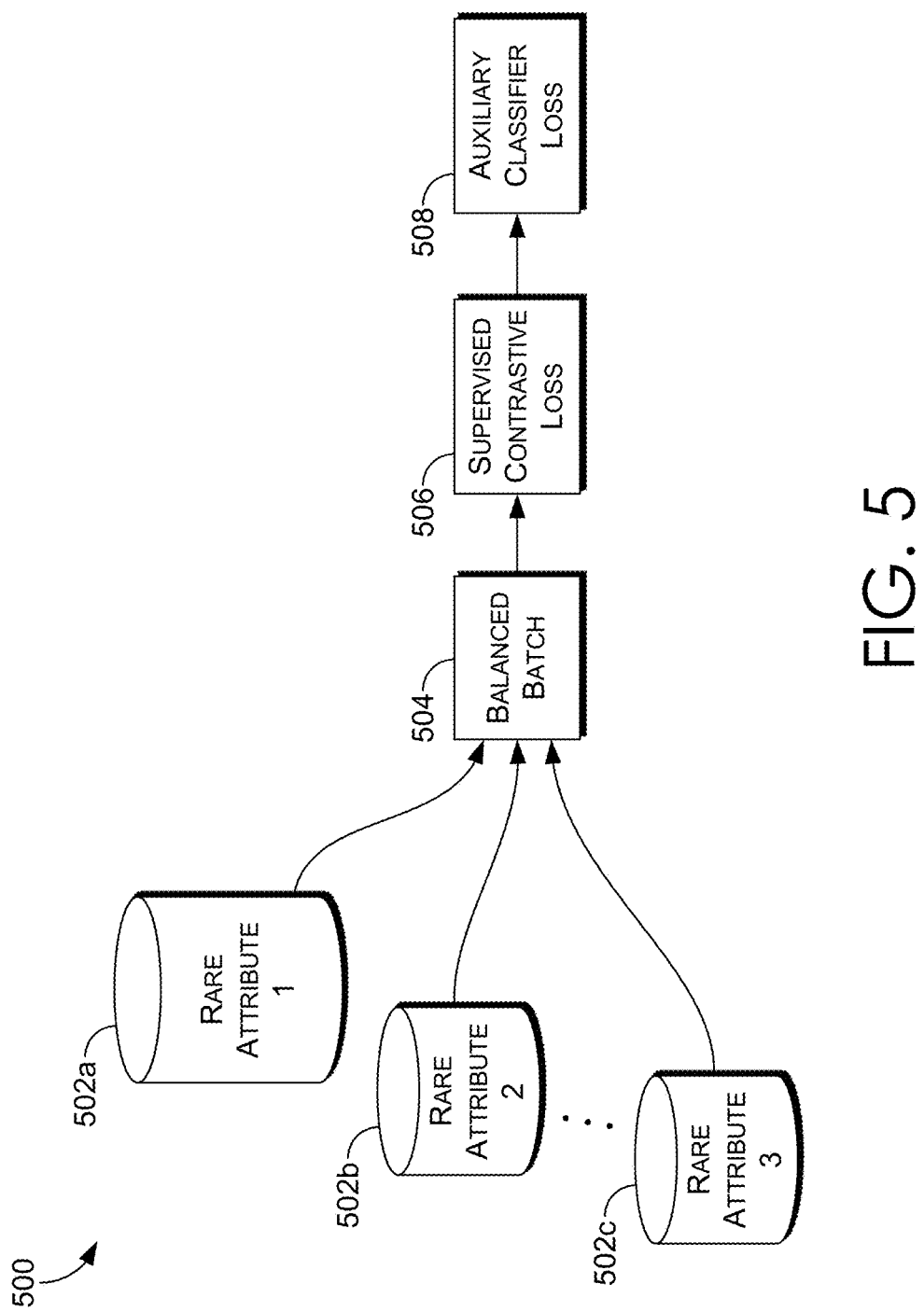
FIG. 5 is a block diagram of a debiasing process in accordance with some implementations of the present disclosure.

FIG. 5 is a block diagram of a debiasing process in accordance with some implementations of the present disclosure. The system 500 of FIG. 5 is used in the three step process described above. The minority attributes are designated as 502a, 502b, and 502c. These minority attributes can be images that include eyeglasses, bald, or wearing hat that can cause problems in image translation models. A minority attribute, one of 502a, 502b, and 502c, is selected, and used to create the balanced batch 504. The balanced batch 504 includes more examples of the minority attribute to be used in the image-to-image translation task. The method operates on one minority attribute at a time, however, the method can be repeated for a further rare attribute.

Once the balanced batch 504 is created, images from the balanced batch 504 are used to train an image translation model. As part of the training, supervised contrastive loss 506 and auxiliary classifier loss are applied. A final loss can be calculated and the results used to back-propagate and train the image translation model.

Example Methods for Debiasing Image-to-Image Translation Models

Figure 6:
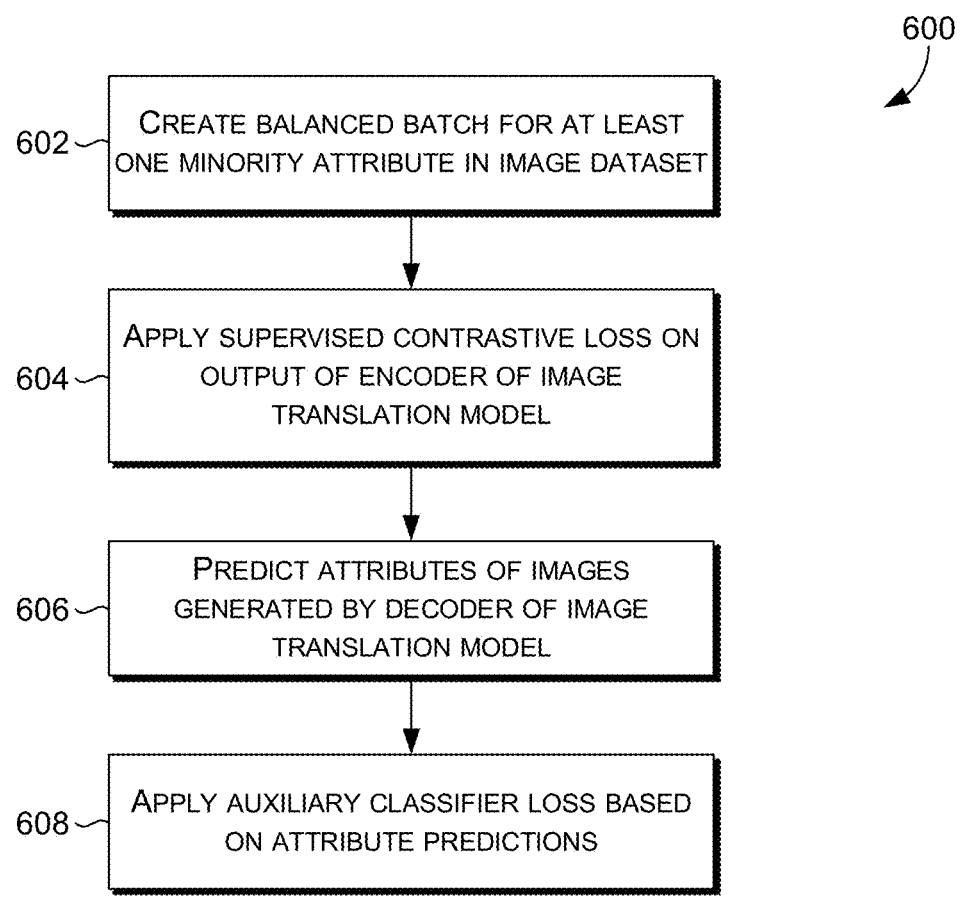
FIG. 6 is a flow diagram of a method for debiasing image-to-image translation models in accordance with some implementations of the present disclosure.

With reference now to FIG. 6, a flow diagram is provided that illustrates a method 600 for debiasing an image translation model. The method 600 can be performed, for instance, by the image processing system 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, a balanced batch is created for at least one minority attribute in an image dataset. The image dataset can be, for instance, a collection of images of faces, items, or animals. The minority attributes can vary with the image dataset. For example, minority attributes for a faces image dataset can include attributes such as "bald," "eyeglasses," or "wearing hat".

Images from the balanced batch are used to train an image translation model such that the image translation model is debiased for one or more minority attributes. In some configurations, minority attributes are debiased one at a time. For instance, correcting for one minority attribute, such as "bald" does not correct for a second minority attribute, such as "eyeglasses" that can be present in the same image. Successive training can be used to correct for additional minority attributes.

As shown at block 604, training of the image translation model includes applying a supervised contrastive loss on output of an encoder of the image translation model. The encoder takes images and generates latent representations (i.e., latent codes) of the images as output. The supervised contrastive loss pulls together latent representations of images from the same class (whether minority or majority) in the latent space, while pushing apart latent representations of images from different class in the latent space.

As shown at block 606, a classifier is used to predict whether images generated by a decoder of the image translation model (using the latent representations from the encoder as input) include the minority attribute. An auxiliary classifier loss is applied given the attribute predictions, as shown at block 608. The auxiliary classifier loss comprises a binary cross entropy loss based on the attribute predictions. The auxiliary classifier loss further assists in separating latent representations of images in the latent space based on attributes.

Training of the image translation model can include back-propagating to update weights and/or other parameters of the image translation model based on the supervised contrastive loss and the auxiliary classifier loss. Once the image translation model has been trained, the image translation model can be used to perform an image-to-image translation task. For instance, if the image translation model has been trained to perform a super resolution task, the image translation model can produce a generated image in a high resolution from an input image in a low resolution. Because, the image translation model has been debiased for one or more minority attributes, the image translation model can provide generated images that include a minority attribute when the input images include the minority attribute.

Experimental Results

To illustrate performance, aspects of the technology described herein were applied to two synthetic bias datasets. The CelebA-HQ dataset was chosen to use in debiasing a human face dataset. Bias in the CelebA-HQ dataset occurs naturally. Equal numbers of images were selected from both minority attributes and majority attributes for validation and testing. The number of images from minority classes is quite low, for example, 700 images for "bald". A balanced batch was created with 50 images from each attribute class for validation, making 100 total images. 150 images were used for the test set of each attribute, for a total of 300 images. For the rest of the images, the training dataset was adjusted so that the original bias ration remained unchanged for the selected attributes.

The first synthetic dataset consisted of images of handbags from the dataset "edge2bags", where 4950 images are in the "shoes" category, and the remaining 50 images are from the "bags" category. This makes for a 99:1 bias ratio. This first dataset is known as the "bags and shoes" dataset. 200 images are kept separate for both the validation and test sets.

The second synthetic dataset consisted of images of animal faces from AFHQ. The animal faces selected are "cats" and "dogs". The training, validation, and testing follow the same patterns as were used with "bags and shoes". For the second synthetic dataset, the majority attribute is "cats" and the minority attribute is "dogs".

For experiments with faces, two common and popular image-to-image translation tasks were tested, super-resolution and sketch-to-face. The model pSp was used as the baseline image translation model. The process began with Step I, over-sampling the minority attribute to produce an even ratio of majority attributes to minority attributes in a balanced batch. Data augmentations were also be applied to the images. The data augmentations can include shifting, shearing, scaling, horizontal flipping, and the like. The encoder encoded the input images using a feature pyramid backbone and then mapped the images to the extended latent space of a frozen Style-GAN2 generator, $\mathcal{W}+$, which consists of eighteen different 512-dimensional feature vectors, one for each StyleGAN2 layer.

In Step II, supervised contrastive loss was applied to the latent codes in each of the layers in $\mathcal{W}+$ separately. The latent codes were followed by MLP layers, which consist of two linear feed forward networks with 512 hidden units and a ReLU activation in between, that is, one MLP for each of the eighteen input layers in StyleGAN2. The temperature parameter in equation (1) is set to 0.7.

Step III of the method applied the auxiliary classifier loss on the outputs of the decoder. The ResNet50 classifier was trained on the same training sets for each attribute. The accuracies on the respective balanced test set were: "bald" 90%, "eyeglasses" 99%, and "wearing hat" 95.33%. The entire network was then trained by applying the original losses as well as the proposed losses.

The debiasing of image-to-image translation tasks can use a variety of models. As a baseline, the original pSp network was used and named "Vanilla". The network was trained from for each of the attributes. A "Sampling Baseline" was used to re-sample images from the minority attributes to create a balanced batch, which is Step I of the method. A further model variant "Ours I+II" incorporates Steps I and II from the method, both re-sampling and applying supervised constructive loss, Equation (1) during the encoding/decoding phase. Yet another model variant is "Ours I+III" that considers only re-sampling and applying auxiliary loss, Equation (2). A still further model variant is "Ours I+II+III" which applies all three steps of the debiasing framework.

The model variants all use a frozen StyleGAN2 as the decoder. The decoder is pre-trained on the FFHQ, which provides good coverage for attributes such as eyeglasses, hats, and similar minority attributes. Rare attributes in CelebA-HQ were successfully generated, showing that the latent codes are available, but that the problem arises in the pSp encoder. The pSp encoder becomes biased during training when the training uses a biased dataset, such as CelebA-HQ.

The debiasing framework described herein can be used with a wide variety of image-to-image translation architectures and can be applied to images from domains other than human faces. The method has also been used to perform sketch-to-image tasks on synthetic datasets for "Bags and Shoes" and "Cats and Dogs". For these synthetic datasets, the same model variants described above were used. For the "Ours I+II+III", supervised contrastive loss was applied to the output of the bottleneck layer of the encoder. After applying supervised contrastive loss, the features were passed through MLP layer $\phi$ and an auxiliary classifier loss was added.

Each of the models can be evaluated using the classifier prediction scores on the generated images. In this reporting, the minority attribute groups have a label of "1" and the majority attribute groups have a label of "0". To report the probabilities in the same scale for images with a "0" label the prediction is subtracted from one. A model is regarded as better if the scores are high for the minority attribute group while maintaining the performance on the majority attributes. To train the classifier to perform the evaluation, a deeper network ResNet152 is trained on the same training sets. As an example, this improves the accuracy of the prediction for "bald" at 94% and "eyeglasses" at 99.33%, which is reliable for prediction. An additional advantage is that the evaluation classifier network architecture and weights separate from the ResNet50 network which was used for supervised contrastive loss during training. This provides a fair evaluation as the evaluation should not be performed with a classifier which was also used for training because the network is optimized to perform well for that classifier. For the super-resolution task with pSp, the learned perceptual similarity (LPIPS) metrics and mean square error (MSE) were used to evaluate whether the generated images match the target images. When pix2pix is used, only edge-to-image synthesis is performed and there can be multiple valid images. To overcome this issue, the Frechet inception distance (FID) was used to measure if the generated images match the real description of their respective classes. The FID was used because LPIPS and MSE do not apply because multiple outputs other than ground truth are possible.

The results for the models are given below in Table 2. A common pattern visible in Table 2 is that the models perform better than "Vanilla" and the "Sampling Baseline" for the minority attributes. This result was expected because the "Vanilla" models are biased to the majority attributes. Table 2 also shows the individual contributions of each of the three steps, Steps I, II, and III, of the model. Applying only supervised contrastive loss, Step II, on top of re-sampling, Step I, improves results. Adding Step III, the auxiliary classifier loss on top of re-sampling, Step I, improves results further. When all three steps, Steps I, II, and III are applied the prediction scores are improved for nearly all instances of the minority attribute. Table 3, also below provides quantitative results for image reconstruction in the super-resolution task.

TABLE 3

Quantitative results for image reconstruction in the super-resolution task. Our approach does not compromise image quality.

| Model | LPIPS↓ | MSE↓ |
| --- | --- | --- |
| Vanilla | 0.25 ± 0.06 | 0.06 ± 0.03 |
| Sampling Baseline | 0.24 ± 0.06 | 0.05 ± 0.03 |
| Ours (I + II) | 0.25 ± 0.06 | 0.06 ± 0.03 |
| Ours (I + III) | 0.24 ± 0.06 | 0.05 ± 0.03 |
| Ours (I + II + III) | 0.25 ± 0.06 | 0.06 ± 0.03 |

Figure 7A:
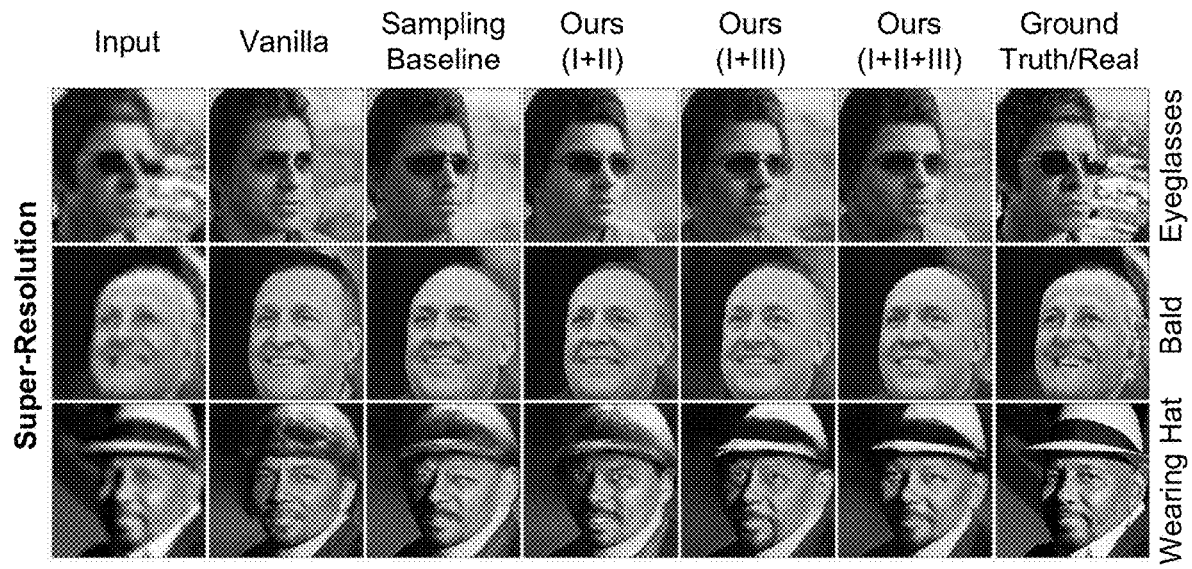
FIG. 7A illustrates results for the debiasing process for super-resolution in accordance with some implementations of the present disclosure.

FIG. 7A illustrates results for the debiasing process for super-resolution in accordance with some implementations of the present disclosure. FIG. 7A shows the generated images from each model for each attribute and task. The ground truth images for the super-resolution task is shown in the far right column. Comparing the images, it is evident that the "Vanilla" model does not produce the desired outcome, with black patches around the eyes generated in place of the eyeglasses. The "Sampling Baseline" improves significantly over "Vanilla", however, visible artifacts appear in the generated images. These artifacts can be eyeglasses without frames, to give one example. The results for "Bald" indicate that applying Steps I and III, which is, applying only the auxiliary classifier without contrastive loss produce the same problems as the "Vanilla" and "Sampling Baseline", with both generating hair.

The minority attribute "wearing hat" appears to be the attribute most difficult to reconstruct for both super-resolution and sketch-to-face tasks. For this minority attribute, the three steps, Steps I, II, and III produce hat-like shapes and textures. While the "wearing hat" attribute poses challenges for the three step process, the results are significantly improved over baseline results.

Figure 7B:
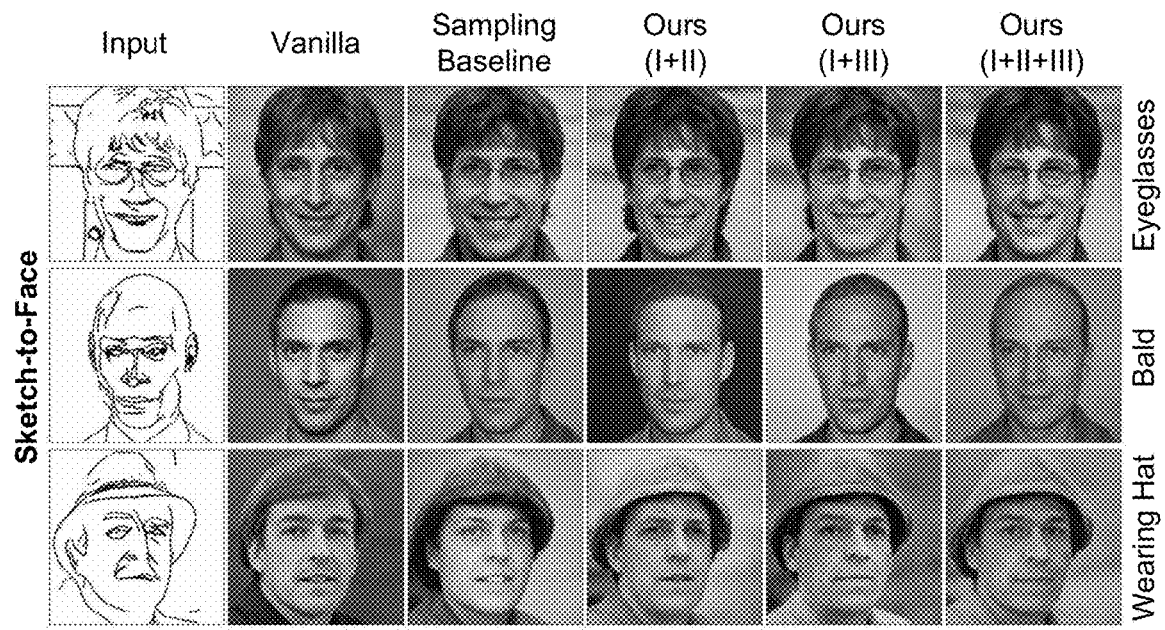
FIG. 7B illustrates results for the debiasing process for sketch-to-face in accordance with some implementations of the present disclosure.

FIG. 7B illustrates results for the debiasing process for sketch-to-face in accordance with some implementations of the present disclosure. As noted above, the three step process produces results better than the "Vanilla" and "Sampling Baseline". While both "bald" and "wearing hat" do not match the input sketch-to-face image, the generated images do at least suggest the minority attributes.

TABLE 2

Comparison of Classifier prediction scores on all groups am87.81 ong the models across different tasks and attributes.

| Task | Attribute | Group | Vanilla | Sampling Baseline | Ours (I + II) | Ours (I + III) | Ours (I + II + III) |
| --- | --- | --- | --- | --- | --- | --- | --- |
| Super Resolution | Eyeglasses | Minority | 15.27 | 89.95 | 91.55 | 92.35 | 92.85 |
| | | Majority | 98.52 | 98.21 | 98.6 | 97.8 | 98.7 |
| | | Both | 56.89 | 94.08 | 95.08 | 95.08 | 95.77 |
| | Bald | Minority | 63.91 | 88.89 | 90.41 | 90.12 | 91.60 |
| | | Majority | 98.18 | 97.53 | 98.01 | 98.01 | 98.01 |
| | | Both | 81.04 | 93.21 | 94.21 | 94.06 | 94.81 |
| | Wearing Hat | Minority | 23.19 | 60.71 | 61.95 | 78.31 | 80.84 |
| | | Majority | 98.4 | 97.62 | 97.93 | 97.95 | 98.21 |
| | | Both | 60.8 | 79.17 | 79.94 | 88.13 | 89.52 |
| Sketch-to-Face | Eyeglasses | Minority | 30.62 | 92.73 | 93.30 | 94.10 | 94.06 |
| | | Majority | 98.65 | 96.05 | 97.99 | 98.7 | 98.84 |
| | | Both | 64.48 | 94.39 | 95.64 | 96.39 | 96.45 |
| | Bald | Minority | 46.88 | 85.26 | 81.03 | 86.80 | 89.12 |
| | | Majority | 98.3 | 85.47 | 97.09 | 96.46 | 95.53 |
| | | Both | 72.59 | 90.36 | 89.06 | 91.63 | 92.32 |
| | Wearing Hat | Minority | 15.25 | 32.38 | 50.49 | 78.61 | 79.50 |
| | | Majority | 98.37 | 98.07 | 97.69 | 97.01 | 97.19 |
| | | Both | 56.98 | 65.22 | 74.09 | 87.81 | 88.34 |

Figure 8:
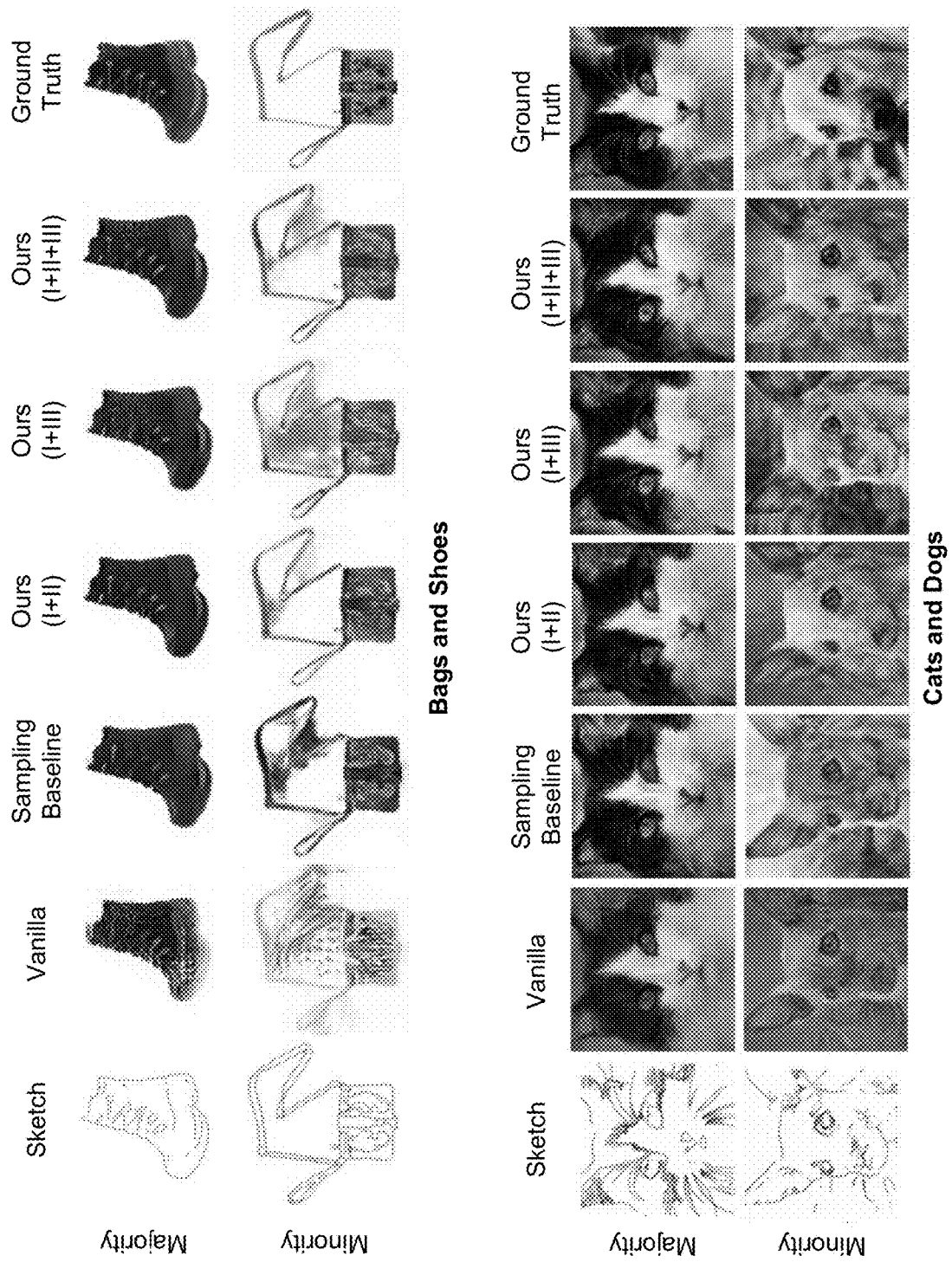
FIG. 8 illustrates results for the debiasing process for synthetic images in accordance with some implementations of the present disclosure.

FIG. 8 illustrates results for the debiasing process for synthetic images in accordance with some implementations of the present disclosure. The debiasing process can be applied to other datasets besides human faces, such as pix2pix. FIG. 8 shows the qualitative results among the models for sketch-to-image tasks. The quality of the majority attributes does not change significantly for both the "bags and shoes" dataset and the "cats and dogs" dataset. In the "bags and shoes" dataset both the "Vanilla" and the "Sampling Baseline" attempt to fill in the area between the body of the bag and the carrying strap. This problem occurs because "shoes" are majority attributes in the dataset and "bags" is a minority attribute. "Shoes" have a solid contour which is filled, while "bags" have an open contour that is not filled. The generative model attempts to resemble the majority attributes ground truth image by filling the gap between the bag and the strap. The contrastive learning approaches using Steps I, II, and III do not fill the gap between the strap and the bag and display minimal changes compared with other models.

A similar pattern occurs for the "cats and dogs" dataset where cats are the majority attribute and dogs are a minority attribute. The majority attribute leads to the frequent pattern of fur like cats. This bias can be seen in the images for the minority group "dogs" in the generated images. When the three steps, Steps I, II, and III, are applied, the generated image is more dog-like. Table 4 shows the FID scores which demonstrate the effectiveness of the three step process in reducing bias.

TABLE 4

FID scores show effectiveness of our approach in other image-to-image translation architecture and images from different domains.

| Model | Bags and Shoes | | | Cats and Dogs | | |
|---|---|---|---|---|---|---|
| | Minority | Majority | Both | Minority | Majority | Both |
| Vanilla | 202.30 | 233.92 | 195.29 | 241.98 | 64.32 | 136.86 |
| Sampling Baseline | 135.22 | 159.33 | 130.16 | 189.35 | 70.40 | 116.92 |
| Ours (I + II) | 140.26 | 151.63 | 128.51 | 181.29 | 76.22 | 116.24 |
| Ours (I + III) | 130.73 | 152.66 | 124.66 | 183.04 | 65.82 | 111.99 |
| Ours (I + II + III) | 122.77 | 116.89 | 105.18 | 177.22 | 68.42 | 110.7 |

Figure 9:
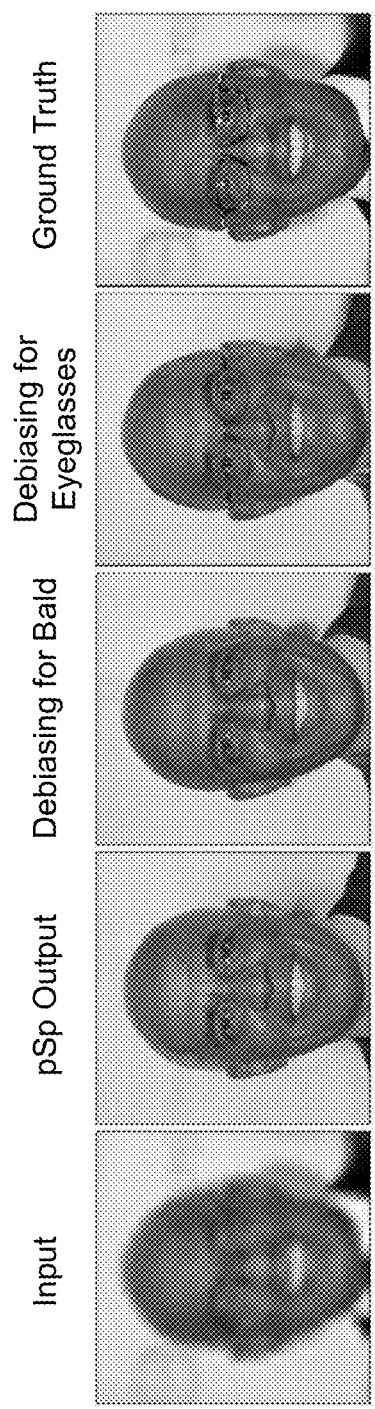
FIG. 9 illustrates dual bias in an image in accordance with some implementations of the present disclosure.

FIG. 9 illustrates dual bias in an image in accordance with some implementations of the present disclosure. In particular, FIG. 9 depicts an example of dual bias with multiple minority attributes appearing in the same image. As FIG. 9 shows, debiasing for "bald" does not debias for "eyeglasses". Multiple minority attributes can be addressed using the same three step process with modifications. One modification is to merge multiple labels into a single class, for example "bald and eyeglasses" as a single class. A potential drawback to this approach is it might not be scalable if the number of labels is large. In such a situation, it may be advantageous to debias each attribute separately.

Debiasing datasets for minority attributes such as "eyeglasses", "bald", and "wearing hat" used datasets such as the CelebA-HQ dataset. Separate datasets were made for the minority attributes. Because the number of images with the minority attributes is quite low, in one embodiment, 400 images in total were held out from the remaining images for validation and testing. As part of the testing process, the training dataset was adjusted such that the original bias ratio was unchanged. Table 5 below provides the number of images for each of the original training datasets along with validation and test results. The FID scores in Table 5 show the effectiveness of the approach in other image-to-image translation architectures and images from different domains.

TABLE 5

| Attribute | Group | Train | Validation | Test |
|---|---|---|---|---|
| Bald | Minority | 512 | 50 | 150 |
| | Majority | 21,062 | 50 | 150 |
| | Both | 21,574 | 100 | 300 |
| Wearing Hat | Minority | 870 | 50 | 150 |
| | Majority | 23,523 | 50 | 150 |
| | Both | 24,393 | 100 | 300 |
| Eyeglasses | Minority | 1,268 | 50 | 150 |
| | Majority | 24,645 | 50 | 150 |
| | Both | 25,913 | 100 | 300 |

The training procedure included data augmentations and classifiers. Data augmentations were applied to both majority attribute classes and minority attribute classes. The augmentations consisted of shifting ten percent both vertically and horizontally, shearing ten percent, scaling ten percent, and mirror flipping. For training purposes, the last fully connected layer of a pre-trained ResNet50 deep learning model was replaced and the deep learning model retrained on the training dataset. This classifier was then used to apply the auxiliary classifier loss. A total of three separate classifiers were trained, one for each minority attribute. The performance of the "bald" classifier was as follows: F1 score 0.8889, prediction score: 87.13%, accuracy: 90%. For the "eyeglasses" classifier, the performance was as follows: F1 score 0.9899, prediction score: 95.99%, accuracy: 90%. For the "wearing hat" classifier, the performance was as follows: F1 score 0.951, prediction score: 90.65%, accuracy: 95.33%. In order to keep the evaluation classifier separate from training, the ResNet152 was trained separately, using the process described above.

For the ResNet152, the performance on the classifier "bald" was: an F1 score of 0.9362, a prediction score of 90.16%, and an accuracy of 99.33%. Similar results were obtained for the "eyeglasses" classifier with an F1 score of 0.9933, a prediction score of 94.67%, and an accuracy of 99.33%. For the "wearing hat" classifier, the results were an F1 score of 0.951, a prediction score of 91.44%, and an accuracy of 95.33%. The classifier described above to calculate the F1 scores was used to calculate the F1 scores on both real images and generated images for measuring bias. Those results are reported in Table 1, above. Table 6 shows the F1 scores on low resolution and sketch input images and also shows the training and validation test splits used for testing specific attributes. The numbers indicate that for most of the attributes, and in particular, "eyeglasses" and "wearing hat", there is sufficient information in the input images to generate the attributes in question.

TABLE 6

| Attribute | Bald | Wearing Hat | Eyeglasses | Blond Hair | Bangs | Black Hair | Male | Heavy Makeup | High Cheekbones | Smiling |
|---|---|---|---|---|---|---|---|---|---|---|
| Percentage ↓ | 2.37 | 3.57 | 4.89 | 17.09 | 18.08 | 21.97 | 36.86 | 45.69 | 46.16 | 46.97 |
| Low-Resolution Inputs | 0.6488 | 0.8523 | 0.6613 | 0.5891 | 0.6280 | 0.8173 | 0.9414 | 0.2988 | 0.4641 | 0.7595 |
| Sketches | 0.2234 | 0.7215 | 0.8747 | 0.0000 | 0.3366 | 0.0311 | 0.7615 | 0.5590 | 0.1606 | 0.5848 |

To use the pix2pix database, the U-Net architecture was used for the sketch-to-image translation model. In this embodiment, the contrastive loss was applied only to the last layer of the U-Net encoder. To train the model for both pSp and pix2pix, a curriculum learning process was used. Both the supervised contrastive loss and the auxiliary classifier loss were introduced after k iterations. The number of iterations, k, can vary and can be adjusted depending on attributes and tasks. A small value of m was used for both hyperparameters for supervised contrastive loss, $\lambda_s$, and auxiliary classifier loss, $\lambda c$. These hyperparameters were then increased by m every k iterations.

For pSp, k=10,000, and m=0.001. A similar curriculum training process was used for pix2pix. For pix2pix m=0.01. In place of k iterations, both the supervised contrastive loss and the auxiliary classifier loss were applied after the first epoch. The values of the hyperparameters were increased by m after each epoch. For both pSp and pix2pix, Ours (Step I+Step II) and (Step I+Step III) follow the same training steps, except that the hyperparameter for a specific loss was set to zero. For example, for Ours (Step I+Step II), the auxiliary classifier loss was set to zero, while for Ours (Step I+Step III), the supervised contrastive loss is set to zero.

Figure 10:
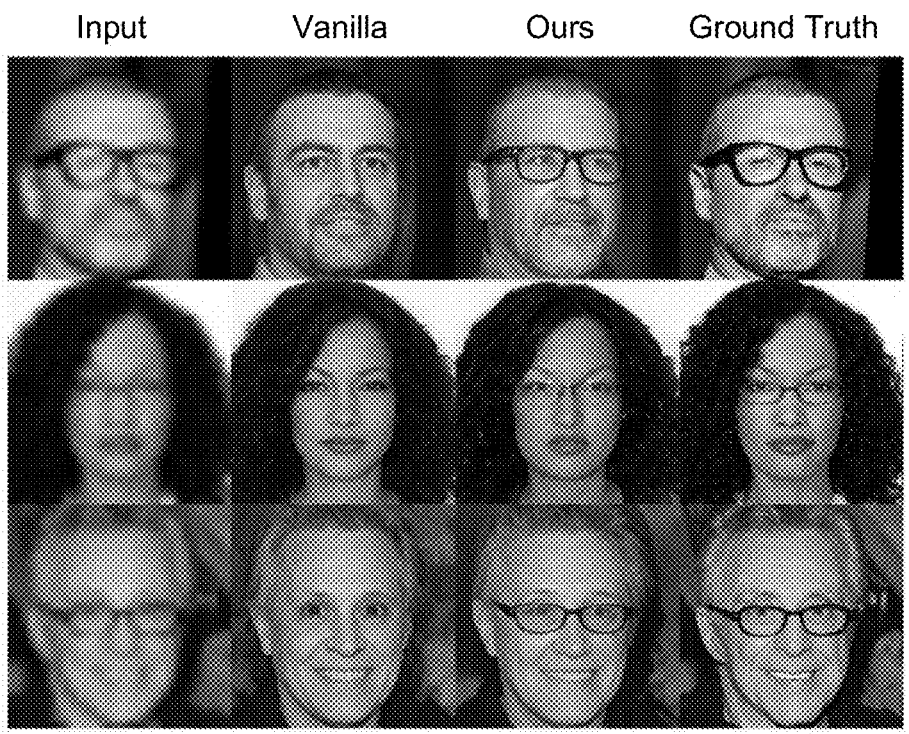
FIG. 10 illustrates results for the debiasing framework for the super-resolution task on the rare attribute "eyeglasses" in accordance with some implementations of the present disclosure.

FIG. 10 illustrates results for the debiasing framework for the super-resolution task on the rare attribute "eyeglasses" in accordance with some implementations of the present disclosure. In FIG. 10, the results are shown for three faces based on the input blurry image and the models Vanilla and Ours. For comparison, the ground truth image is also shown in the right column. The Vanilla model misses the minority attribute "eyeglasses", which the Ours model correctly picks up the eyeglasses. While the eyeglasses differ slightly from the ground truth, the attribute is correctly present.

Figure 11:
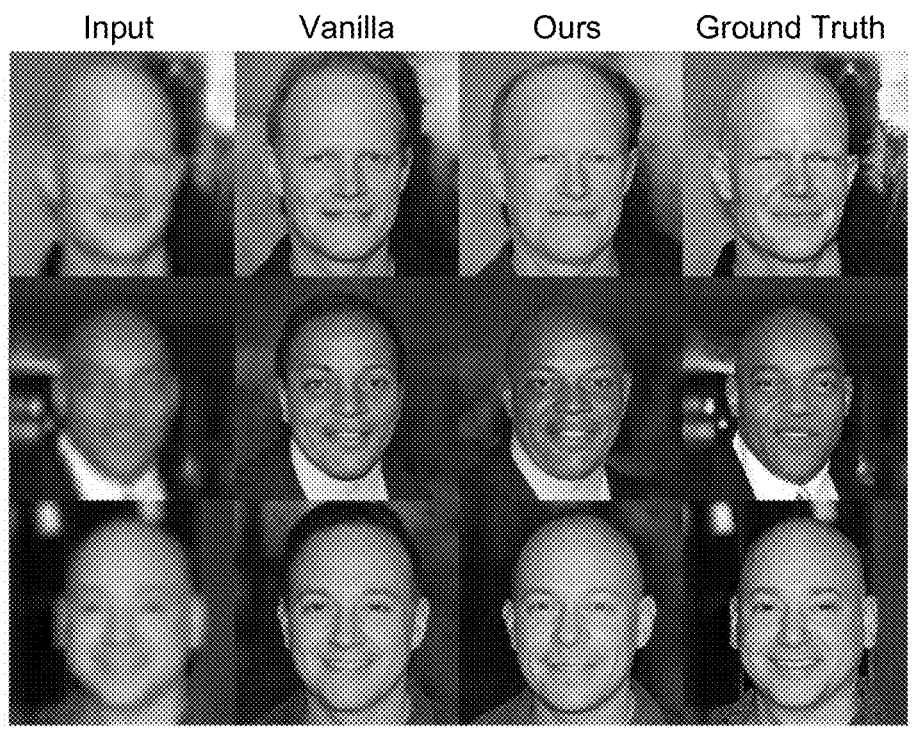
FIG. 11 illustrates results for the debiasing framework for the super-resolution task on the rare attribute "bald" in accordance with some implementations of the present disclosure.

FIG. 11 illustrates results for the debiasing framework for the super-resolution task on the rare attribute "bald" in accordance with some implementations of the present disclosure. In FIG. 11, the results are shown for three faces and again are based on a blurry input image. The Vanilla model hallucinates hair for each image, while the Ours model correctly interprets "bald". Again, while the Ours images do differ slightly from the ground truth image, the attribute "bald" is correctly present.

Figure 12:
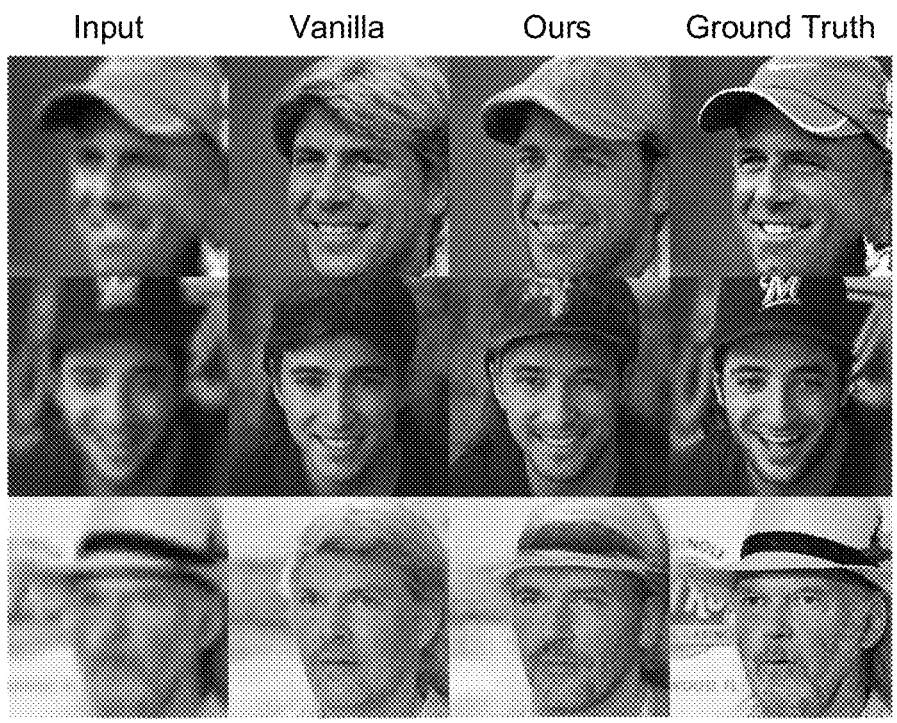
FIG. 12 illustrates results for the debiasing framework for the super-resolution task on the rare attribute "wearing hat" in accordance with some implementations of the present disclosure.

FIG. 12 illustrates results for the debiasing framework for the super-resolution task on the rare attribute "wearing hat" in accordance with some implementations of the present disclosure. The input blurry image appears in the left column. The Vanilla model does not accurately generate an image for "wearing hat" and instead produces hair. If the input image illustrates a green ball cap, then the Vanilla model generates green hair. The Ours model comes closer to producing a hat, however, the details can still default to hair.

Figure 13:
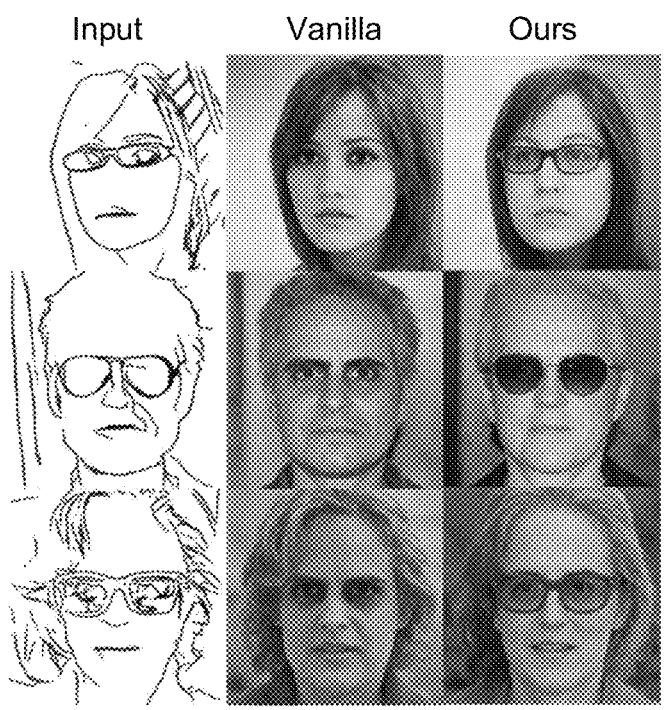
FIG. 13 illustrates results for the debiasing framework for the sketch-to-face task on the rare attribute "eyeglasses" in accordance with some implementations of the present disclosure.

FIG. 13 illustrates results for the debiasing framework for the sketch-to-face task on the rare attribute "eyeglasses" in accordance with some implementations of the present disclosure. The sketch-to-face task input is shown in the left column. The Vanilla model fails to correctly generate eyeglasses in any of the three sketched faces. The Ours model successfully generates eyeglasses in each face.

Figure 14:
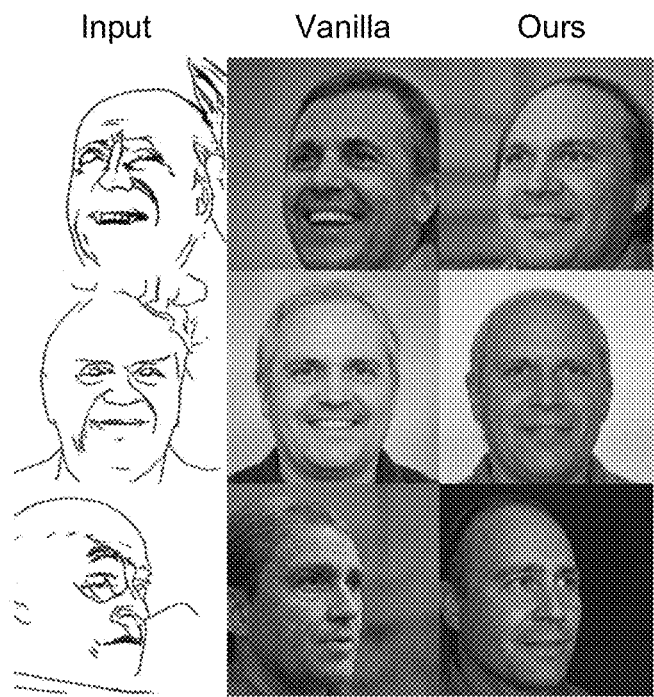
FIG. 14 illustrates results for the debiasing framework for the sketch-to-face task on the rare attribute "bald" in accordance with some implementations of the present disclosure.

FIG. 14 illustrates results for the debiasing framework for the sketch-to-face task on the rare attribute "bald" in accordance with some implementations of the present disclosure. The sketch-to-face task input is shown in the left column. The Vanilla model generates hair for each of the three input sketches, thus failing to generate the bald attribute. The Ours model does generate some hair for each of the sketches, however, at least some partial bald areas are generated.

Figure 15:
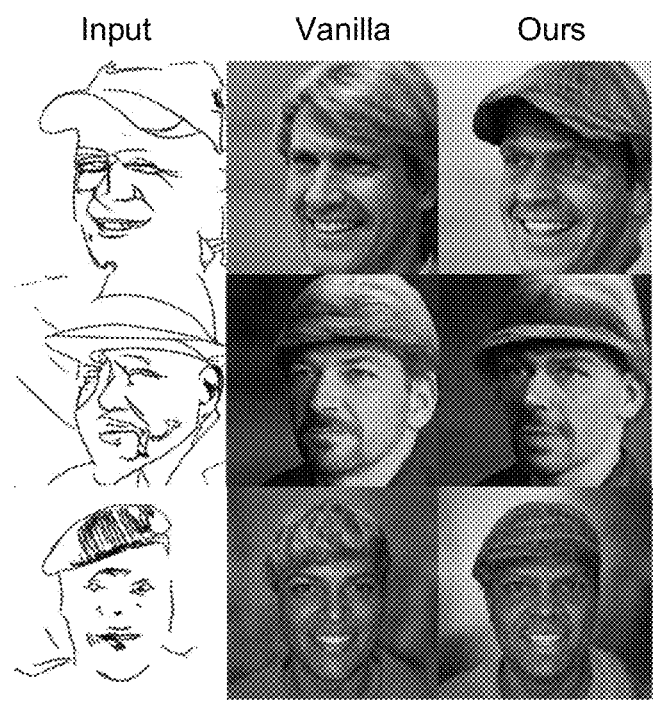
FIG. 15 illustrates results for the debiasing framework for the sketch-to-face task on the rare attribute "wearing hat" in accordance with some implementations of the present disclosure.

FIG. 15 illustrates results for the debiasing framework for the sketch-to-face task on the rare attribute "wearing hat" in accordance with some implementations of the present disclosure. The sketch-to-face task input is shown in the left column. The Vanilla model generates hair in place of "wearing hat" in each of the three task sketches. The Ours model generates an outline that appears hat-like, but hair is still generated in place of the hat material.

Exemplary Operating Environment

Figure 16:
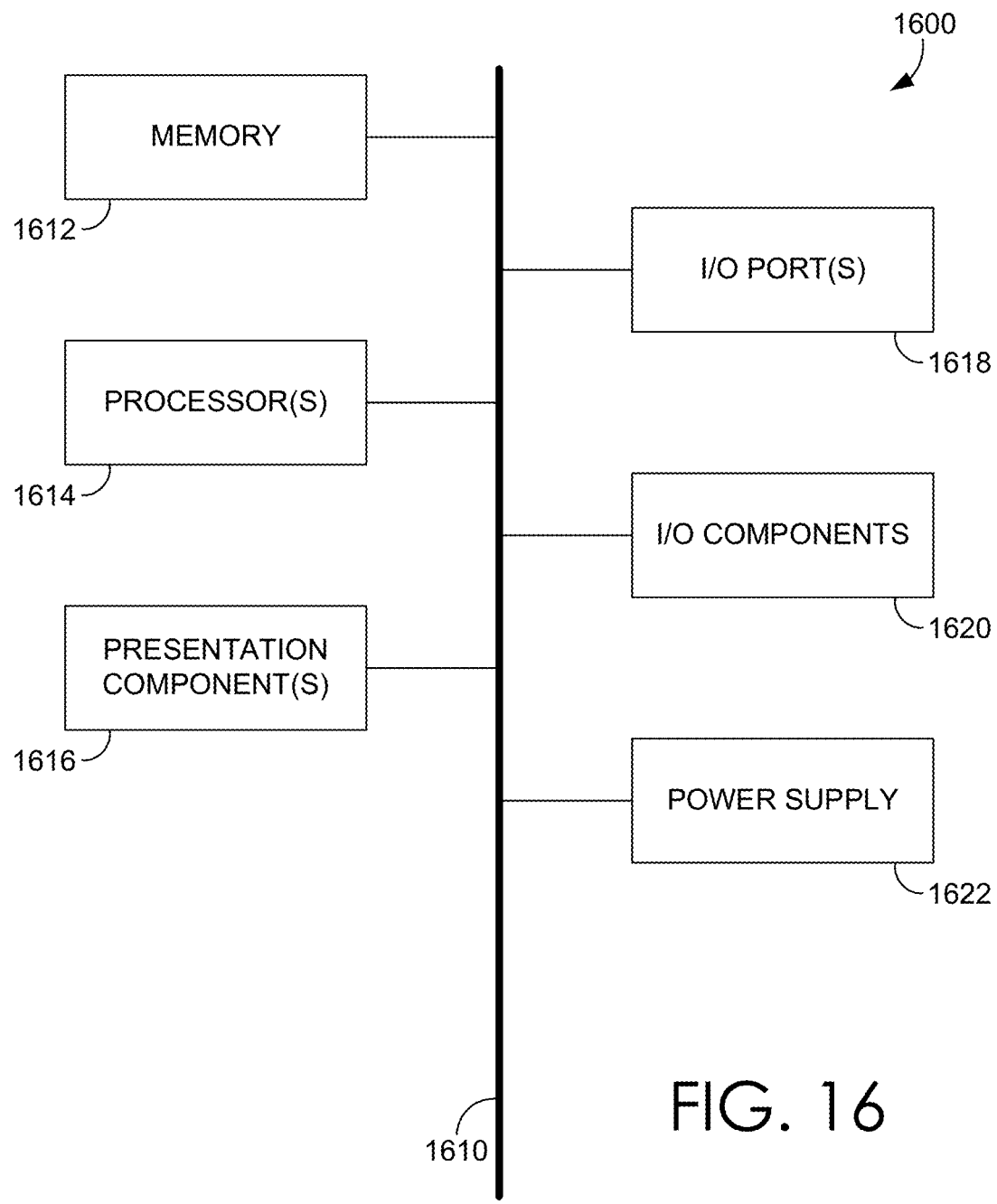
FIG. 16 is a block diagram of an exemplary computing environment suitable for use in implementations of the present disclosure.

Having described implementations of the present disclosure, an exemplary operating environment in which embodiments of the present invention can be implemented is described below in order to provide a general context for various aspects of the present disclosure. Referring initially to FIG. 16 in particular, an exemplary operating environment for implementing embodiments of the present invention is shown and designated generally as computing device 1600. Computing device 1600 is but one example of a suitable computing environment and is not intended to suggest any limitation as to the scope of use or functionality of the invention. Neither should the computing device 1600 be interpreted as having any dependency or requirement relating to any one or combination of components illustrated.

The invention can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention can be practiced in a variety of system configurations, including hand-held devices, consumer electronics, general-purpose computers, more specialty computing devices, etc. The invention can also be practiced in distributed computing environments where tasks are performed by remote-processing devices that are linked through a communications network.

With reference to FIG. 16, computing device 1600 includes bus 1610 that directly or indirectly couples the following devices: memory 1612, one or more processors 1614, one or more presentation components 1666, input/output (I/O) ports 1618, input/output components 1620, and illustrative power supply 1622. Bus 1610 represents what can be one or more busses (such as an address bus, data bus, or combination thereof). Although the various blocks of FIG. 16 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 16 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 16 and reference to "computing device."

Computing device 1600 typically includes a variety of computer-readable media. Computer-readable media can be any available media that can be accessed by computing device 1600 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1612 includes computer storage media in the form of volatile and/or nonvolatile memory. The memory can be removable, non-removable, or a combination thereof. Exemplary hardware devices include solid-state memory, hard drives, optical-disc drives, etc. Computing device 1600 includes one or more processors that read data from various entities such as memory 1612 or I/O components 1620. Presentation component(s) 1616 present data indications to a user or other device. Exemplary presentation components include a display device, speaker, printing component, vibrating component, etc.

I/O ports 1618 allow computing device 1600 to be logically coupled to other devices including I/O components 1620, some of which can be built in. Illustrative components include a microphone, joystick, game pad, satellite dish, scanner, printer, wireless device, etc. The I/O components 1620 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1600. The computing device 1600 can be equipped with depth cameras, such as, stereoscopic camera systems, infrared camera systems, RGB camera systems, and combinations of these for gesture detection and recognition. Additionally, the computing device 1600 can be equipped with accelerometers or gyroscopes that enable detection of motion.

Aspects of the present invention have been described in relation to particular embodiments, which are intended in all respects to be illustrative rather than restrictive. Alternative embodiments will become apparent to those of ordinary skill in the art to which the present invention pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention can generally refer to the technical solution environment and the schematics described herein, it is understood that the techniques described can be extended to other implementation contexts.

From the foregoing, it will be seen that this invention is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing instructions that, when used by one or more processors, cause the one or more processors to perform operations, the operations comprising:
   selecting images from an image dataset to create a balanced batch of images for at least one minority attribute in the image dataset, the balanced batch balancing images with the at least one minority attribute and images without the at least one minority attribute;
   using the balanced batch, training an image translation model to generate images in a second domain that have the at least one minority attribute when given images in a first domain that have the at least one minority attribute, the image translation model trained by:
      applying a supervised contrastive loss to update parameters of the image translation model based on output of an encoder of the image translation model, the output generated by the encoder using images of the balanced image batch as input, the output comprising latent representations of the images of the balanced batch in a latent space of the image translation model, the supervised contrastive loss causing the encoder to pull together latent representations of images in the balanced batch that have the at least one minority attribute and push apart latent representations of images in the balanced batch that do not have the at least one minority attribute,
      using a classifier to generate attribution predictions indicating whether images generated by a decoder of the image translation model using the output of the encoder include the at least one minority attribute, and
      applying an auxiliary classifier loss to update the parameters of the image translation model based on the attribute predictions and attribute labels for images in the balanced batch indicating whether each image includes the at least one minority attribute;
   receiving an input image in the first domain, the input image having the at least one minority attribute; and
   generating, using the image translation model and the input image, a generated image in the second domain, the generated image having the at least one minority attribute.

2. The computer storage media of claim 1, wherein the balanced batch is created by over-sampling the at least one minority attribute.

3. The computer storage media of claim 2, wherein the at least one minority attribute is determined for the image dataset based on the at least one minority attribute having an F1 score below a predetermined threshold.

4. The computer storage media of claim 1, wherein the at least one minority attribute is determined for the image dataset based on a percentage of images from the image dataset in which the at least one minority attribute occurs.

5. The computer storage media of claim 1, the operations further comprising normalizing the latent representations to obtain corresponding directions for applying the supervised contrastive loss.

6. The computer storage media of claim 1, the operations further comprising passing the latent representations through a multi-layer perceptron layer after applying the supervised contrastive loss.

7. The computer storage media of claim 1, wherein the auxiliary classifier loss comprises a binary cross entropy loss.

8. A computer-implemented method comprising:
   creating, by a batch component using an image dataset, a balanced batch of images for at least one minority attribute in the image dataset, the balanced batch balancing images with the at least one minority attribute and images without the at least one minority attribute; and
   training, by a debiasing system using the balanced batch, an image translation model to generate images in a second domain that have the at least one minority attribute when given images in a first domain that have the at least one minority attribute, the image translation model trained by:
      applying a supervised contrastive loss to update parameters of the image translation model based on output of an encoder of the image translation model, the output generated by the encoder using images of the balanced image batch as input, the output comprising latent representations of the images of the balanced batch in a latent space of the image translation model, the supervised contrastive loss causing the encoder to pull together latent representations of images in the balanced batch that have the at least one minority attribute and push apart latent representations of images in the balanced batch that do not have the at least one minority attribute,
      using a classifier to generate attribution predictions indicating whether images generated by a decoder of the image translation model using the output of the encoder include the at least one minority attribute, and
      applying an auxiliary classifier loss to update the parameters of the image translation model based on the attribute predictions and attribute labels for images in the balanced batch indicating whether each image includes the at least one minority attribute.

9. The computer-implemented method of claim 8, the method further comprising:

producing, using the image translation model, a generated image containing the at least one minority attribute based on an input image containing the at least one minority attribute.

10. The computer-implemented method of claim 8, wherein the at least one minority attribute is determined for the image dataset based on the at least one minority attributing having an F1 score below a predetermined threshold.

11. The computer-implemented method of claim 8, wherein the at least one minority attribute is determined for the image dataset based on a percentage of images from the image dataset in which the at least one minority attribute occurs.

12. The computer-implemented method of claim 8, the method further comprising normalizing the latent representations to obtain corresponding directions for applying the supervised contrastive loss.

13. The computer-implemented method of claim 8, the method further comprising passing the latent representations through a multi-layer perceptron layer after applying the supervised contrastive loss.

14. The computer-implemented method of claim 8, wherein the auxiliary classifier loss comprises a binary cross entropy loss.

15. A system comprising:
a computer storage media; and
a processing device, operatively coupled to the one or more computer storage media, to perform operations comprising:
creating, by a batch component, a balanced batch of images by over-sampling images with at least one minority attribute from an image dataset to balance images with the at least one minority attribute and images without the at least one minority attribute; and
training, by a debiasing system using the balanced batch, an image translation model to generate images in a second domain that have the at least one minority attribute when given images in a first domain that have the at least one minority attribute, the debiasing system training the image translation model by:
applying, by a supervised contrastive loss component, a supervised contrastive loss to update parameters of the image translation model based on latent codes in a latent space of the image translation model generated by an encoder of the image translation model, the supervised contrastive loss causing the encoder to pull together latent codes of images in the balanced batch that have the at least one minority attribute and push apart latent codes of images in the balanced batch that do not have the at least one minority attribute, and
applying, by an auxiliary classifier loss component, an auxiliary classifier loss to update the parameters of the image translation model based on predicted attributes of images generated by the image translation model using images from the balanced batch and attribute labels for images in the balanced batch indicating whether each image includes the at least one minority attribute.

16. The system of claim 15, the operations further comprises:
receiving an input image having the at least one minority attribute; and
generating, by the image translation model using the input image, a generated image having the at least one minority attribute.

17. The system of claim 15, the operations further comprising normalizing the latent codes to obtain corresponding directions for applying the supervised contrastive loss.

18. The system of claim 15, the operations further comprising passing the latent codes through a multi-layer perceptron layer after applying the supervised contrastive loss.

19. The system of claim 15, wherein the auxiliary classifier loss comprises a binary cross entropy loss.

* * * * *